W. E. WHITE.
BOXING.
APPLICATION FILED MAR. 23, 1918.

1,284,008.

Patented Nov. 5, 1918.

WITNESSES
Jas. K. McCathran
F. T. Chapman.

INVENTOR
W. E. White,
BY
C. G. Siggers
ATTORNEY

UNITED STATES PATENT OFFICE.

WILLIAM EDWARD WHITE, OF SASKATOON, SASKATCHEWAN, CANADA.

BOXING.

1,284,008.  Specification of Letters Patent.  Patented Nov. 5, 1918.

Application filed March 23, 1918. Serial No. 224,205.

*To all whom it may concern:*

Be it known that I, WILLIAM E. WHITE, a subject of the King of Great Britain, residing at Saskatoon, Province of Saskatchewan, in the Dominion of Canada, have invented a new and useful Boxing, of which the following is a specification.

This invention has reference to journal boxes, and its object is to provide a journal box of simple and particularly strong construction, permitting accurate fitting of the journal-engaging parts to the shaft or journal.

In accordance with the invention there is provided a basic member of the journal box, a cap member and a cover member, which latter incloses the cap member and is associated with the basic member of the journal box in such manner that the bolts for holding the two members together may serve as the bolts for securing the journal box to a supporting structure. Set screws are carried by the cover member and bear against the cap member of the journal box to adjust the latter into proper relation with a journal running in the other member of the journal box. The cap member is provided with an oil well for the lubrication of the journal.

The invention will be best understood from a consideration of the following detail description, taken in connection with the accompanying drawings forming part of this specification with the understanding, however, that while the drawings show a practical form of the invention the latter is not confined to any exact conformity with the showing of the drawing, but may be changed and modified so long as such changes and modifications mark no material departure from the salient features of the invention as expressed in the claims.

In the drawings—

Figure 1:
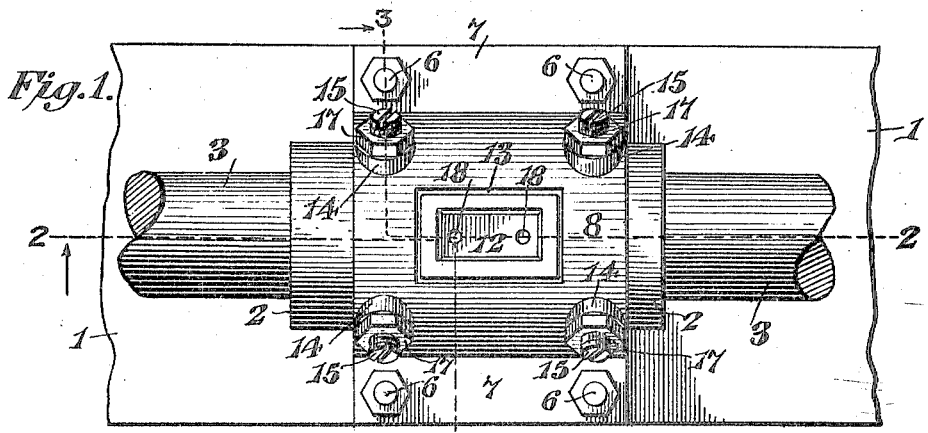
Figure 1 is a plan view of a journal box embodying the invention.
Figure 2:
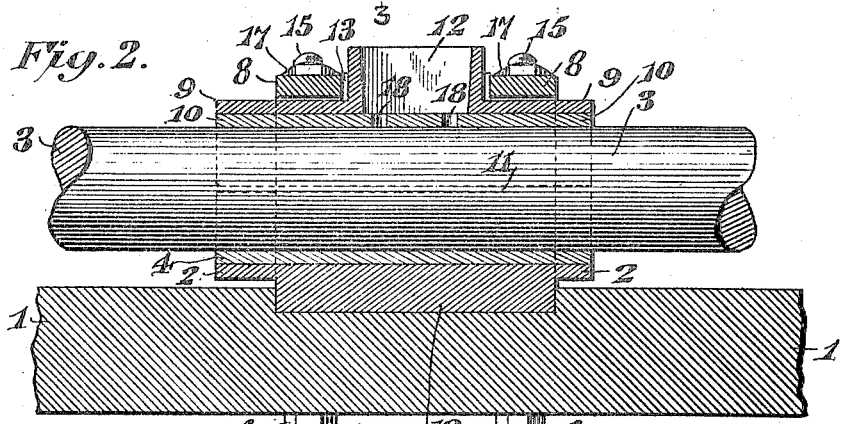
Fig. 2 is a section on the line 2—2 of Fig. 1, with some of the parts shown in elevation.
Figure 3:
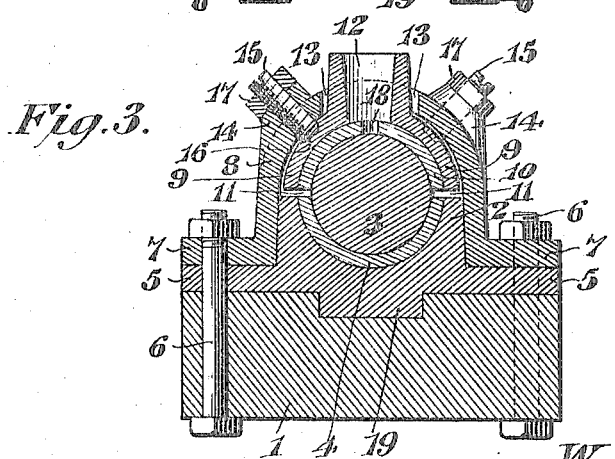
Fig. 3 is a section on the line 3—3 of Fig. 1.

Referring to the drawings there is shown a support 1, which may be considered as representative of any suitable support for a journal bearing. There is also shown a basic member 2 constituting one member of the journal bearing and suitably shaped to support a shaft or journal 3, the basic member 2 being provided with the usual babbitt lining 4. The basic member 2 has opposite side flanges 5 designed to rest upon the support 1, and being secured thereto by bolts 6 or in any other appropriate manner.

Resting upon the flanges 5 and provided with corresponding flanges 7, is a cover member 8 having an intermediate arch portion over hanging the basic member 2 to a sufficient height to permit the passage of the shaft or journal 3, and a cap 9, which latter completes the journal bearing. The cap member 9 is provided with a babbitt lining 10 conforming to the journal or shaft 3, while the cap 9 is arched to fit about the journal to an appropriate extent, so that the linings 4 and 10 nearly encircle the journal bearing where it passes through them. The basic member 2 where receiving the journal, and the cap 9 where engaging the journal, do not quite encircle the latter, there being spaces 11 provided for the reception of shims or liners customarily employed to provide for taking up wear.

The cap member is formed with an oil well 12, and it will be understood that this oil well may have a cover, although such cover is not shown in the drawing but is the usual feature of journal bearings.

The cover member 8 has a top opening 13 therethrough conforming in shape to the exterior of the oil well 12, but sufficiently larger to permit a limited amount of play. At appropriate points, say at the ends of the cover member and on opposite sides of the longitudinal and transverse center lines thereof, are bosses 14 having radial passages tapped therethrough for the reception of set screws 15 passing through the walls of the cover member 8 and entering recesses 16 in the cap member 9. Locking nuts 17 applied to the screws 15 serve to hold the latter in adjusted positions. The babbitt lining 10 is pierced by holes 18 permitting lubricant within the well 12 to reach the journal 3.

It is a feature of the invention, that the journal box may be very accurately adjusted even by one who is not skilled in such work.

While shims may be employed, they may be omitted and very accurate adjustment obtained by the use of the set screws 15, which may be screwed down tightly and then relieved by turning them backwardly a short distance, after which they are locked by the nuts 17. But one set of bolts 6 is necessary to hold both the basic member to the boxing and the cover 8 onto the support 1.

The upper or cap part of the journal bearing need not have any faced surfaces touching any other part of the bearing, thus doing away with tedious and expensive work in making accurate adjustment.

By locating the set screws in radially divergent relation to each other on the opposite sides of the longitudinal and transverse center line of the bearing, they are capable of withstanding a thrust from any direction.

While it is desirable to have the cover member 8 formed in one piece, it may be constructed otherwise, and while four bolts 6 and four set screws 15 are shown in the drawing, it is to be understood that other numbers of bolts and set screws may be employed, in accordance with the needs of journal bearings of different sizes.

When the support 1 is made of wood, it may be advantageous to provide the basic member 2 with a longitudinal tongue 19, capable of being set into the surface of the support, thereby strengthening and centralizing the journal box. Under other circumstances the tongue may be omitted.

When the cap member is being provided with the babbitt lining, this operation can be performed in an ordinary jig, in the usual manner. The cap member not having any faced surfaces touching any other part of the boxing, is not required to be machined.

What is claimed is:—

1. A journal box comprising a basic member, a cap member adapted thereto, and a cover member extending over the cap member and secured to the basic member, and provided with set screws engaging the cap member for holding and adjusting the latter.

2. A journal box comprising a basic member, a cap member adapted thereto, and a cover member extending over the cap member and provided with set screws arranged on opposite sides of both the longitudinal and transverse center lines of the journal box for holding and adjusting the cap member.

3. A journal box comprising a basic member, a cap member adapted thereto and having an oil well thereon, and a cover member inclosing the cap member and provided with a passage therethrough for the oil well with the latter extending beyond the cap member, and said cover member having set screws for holding and adjusting the cap member.

4. A journal box comprising a basic member, a cap member adapted thereto, and a cover member inclosing the cap member and provided with means for holding the cap member, said cap member having an oil well formed thereon and projecting through the cover member, and said cover member having a passage through which the oil well projects, with the passage materially larger than the oil well to permit play of the oil well in the passage.

5. A journal box comprising a basic member, a cap member adapted thereto, and a cover member inclosing the cap member and provided with set screws in radial relation to the longitudinal axis of the journal box whereby the cap member may be accurately adjusted and thrust from various directions resisted.

6. A journal box comprising a basic member, a cap member adapted thereto, and a cover member extending over the cap member and provided with bosses with threaded passages therethrough in radial relation to the longitudinal axis of the journal box, said cover member having set screws in the threaded passages for engaging, adjusting and holding the cap member with reference to a journal carried by the journal box.

7. A journal box comprising a basic member, a cap member adapted thereto, and a cover member extending over the cap member and provided with radial bosses on opposite sides of the longitudinal center line of the journal box, said bosses being provided with radial threaded passages therethrough, set screws extending through the passages and engaging the cap member, and lock nuts on the set screws engaging the bosses.

8. A journal box comprising a basic member with side flanges, a cap member adapted to the basic member and having an oil well formed thereon, a cover member with side flanges matching those of the basic member with the said flanges of the basic member and cover member provided with matching holes for fastening means common to the basic member and cover member, said cover member extending over the cap member and provided with a passage, for the oil well, of larger area than the oil well to permit play of the latter in the passage, set screws carried by the cover member in radial relation thereto and disposed on opposite sides of the longitudinal center line of the cover member, and lock nuts carried by the set screws and engaging the cap member.

9. A journal box comprising a basic member, a cap member adapted thereto and having an oil well thereon, and a cover member inclosing the cap member and provided with a passage therethrough for the oil well with the latter extending beyond the cap member.

10. A journal box comprising a basic member having a babbitt lining adapted to the journal or shaft, a cap member also having a babbitt lining also adapted to the shaft or journal, and a cover member secured to the basic member and partially inclosing the cap member, and provided with means which engage and adjust the cap member with respect to the journal.

In testimony, that I claim the foregoing as my own, I have hereto affixed my signature in the presence of two witnesses.

WILLIAM EDWARD WHITE.

Witnesses:
J. C. FRELEAVER,
VERA ALLEN.

Copies of this patent may be obtained for five cents each, by addressing the "Commissioner of Patents, Washington, D. C."